C. G. G. GROUPE.
AGRICULTURAL APPARATUS.
APPLICATION FILED NOV. 8, 1913.
1,113,431.
Patented Oct. 13, 1914.
3 SHEETS—SHEET 1.
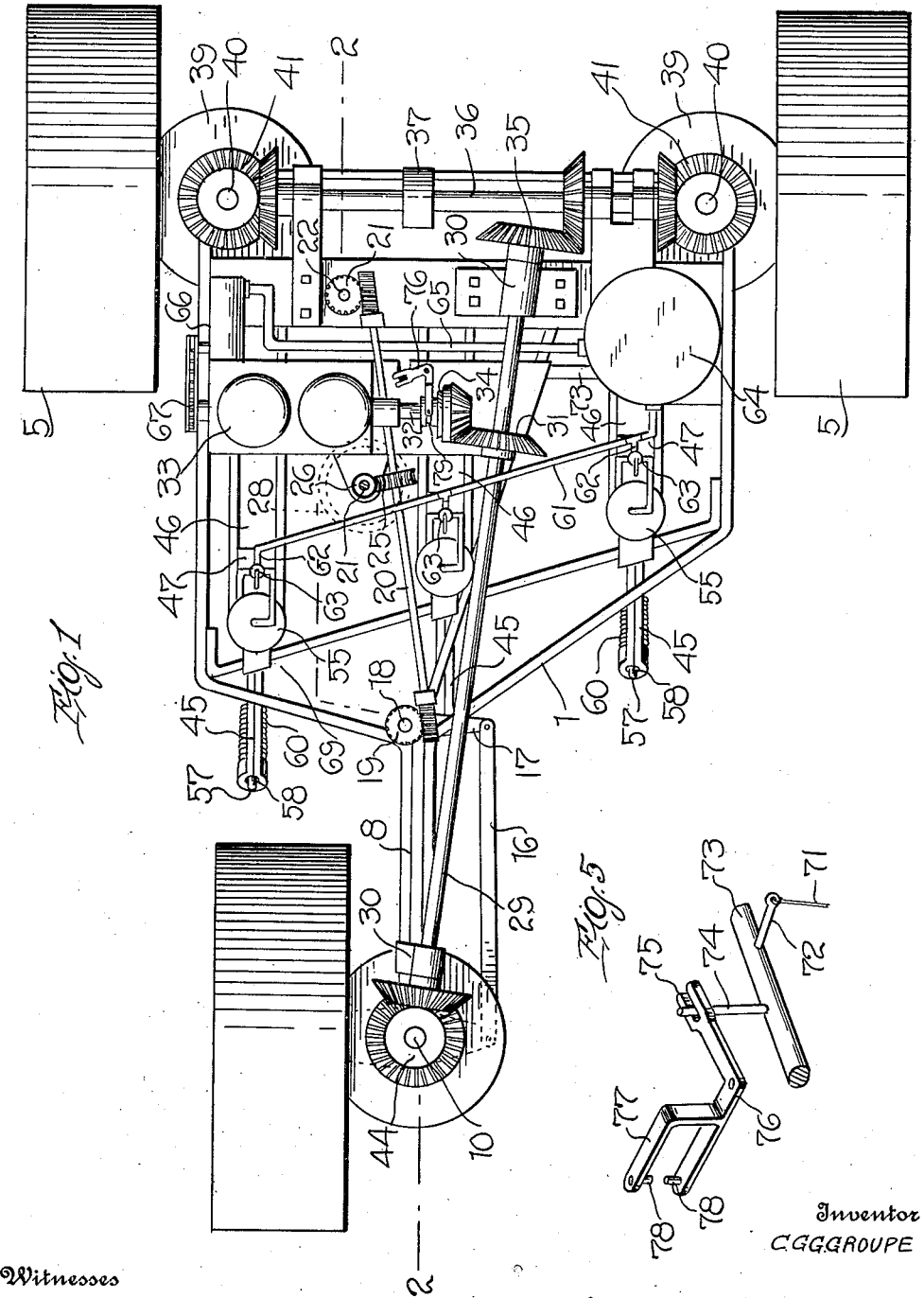
Witnesses
Robert M. Sutphen
A. J. Hind
Inventor
C.G.G.GROUPE
By Watson E. Coleman
Attorney

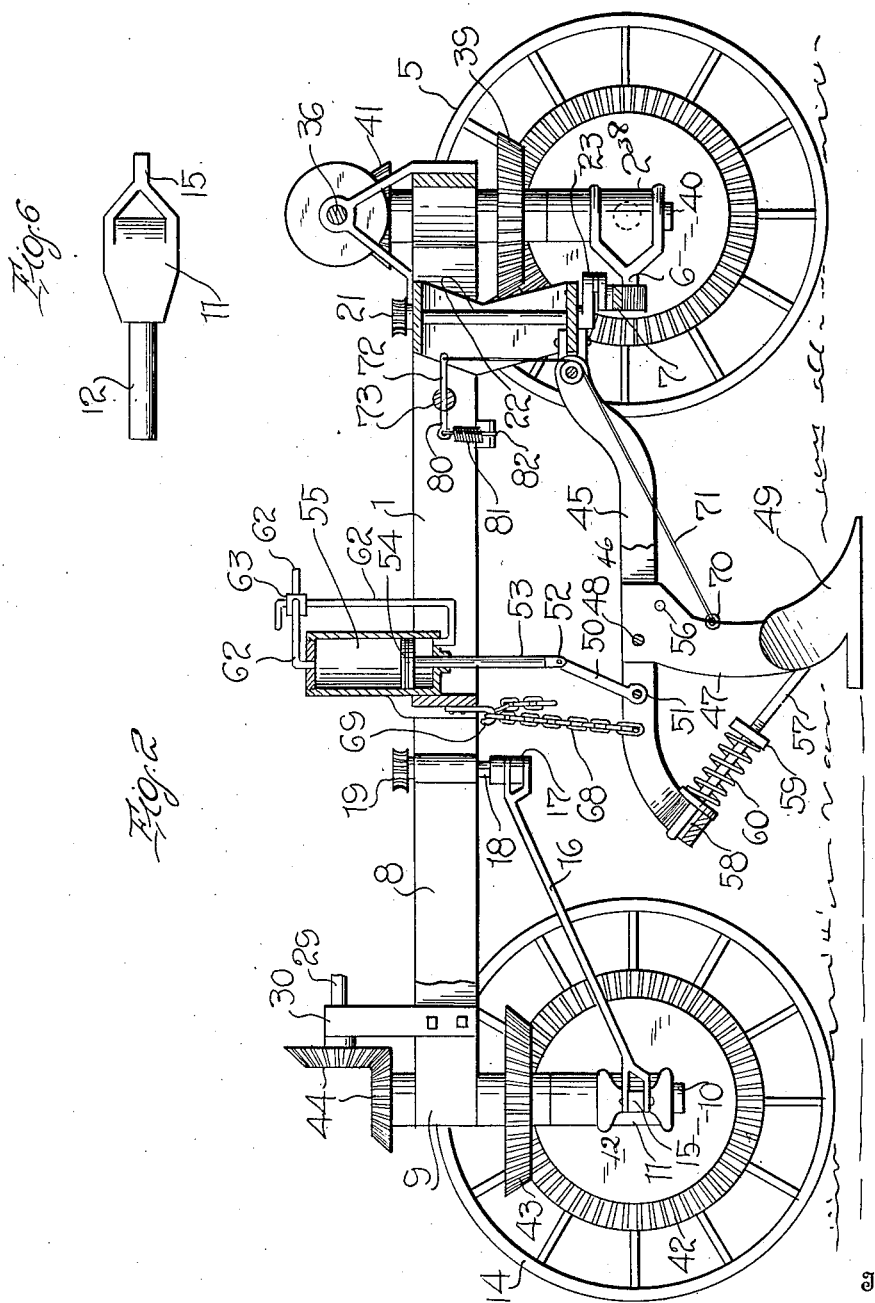

C. G. G. GROUPE.
AGRICULTURAL APPARATUS.
APPLICATION FILED NOV. 8, 1913.
1,113,431.
Patented Oct. 13, 1914.
3 SHEETS—SHEET 3.
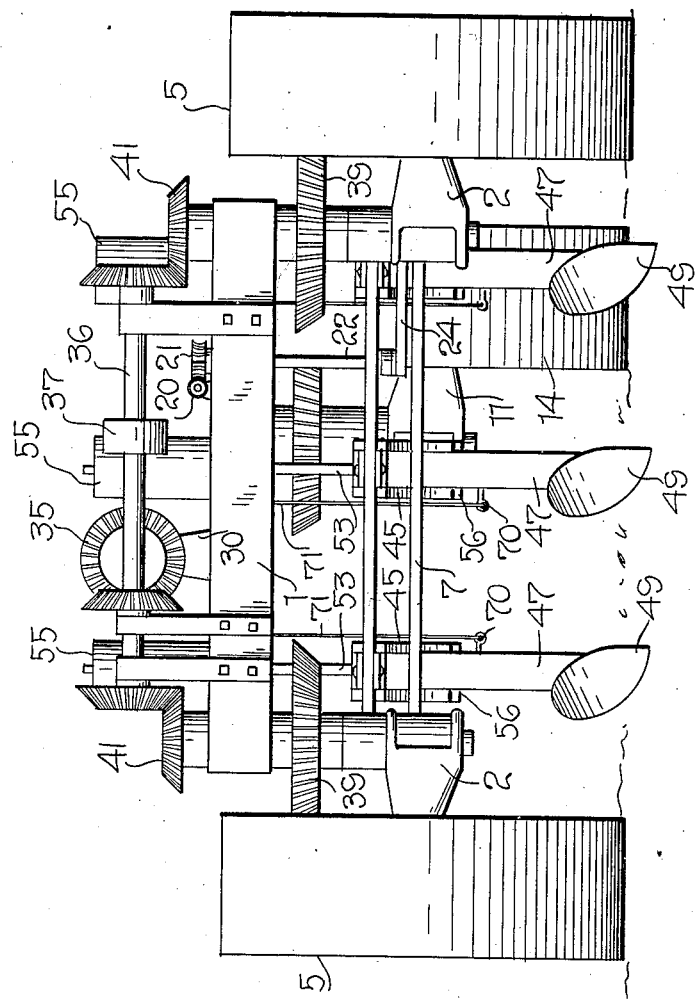
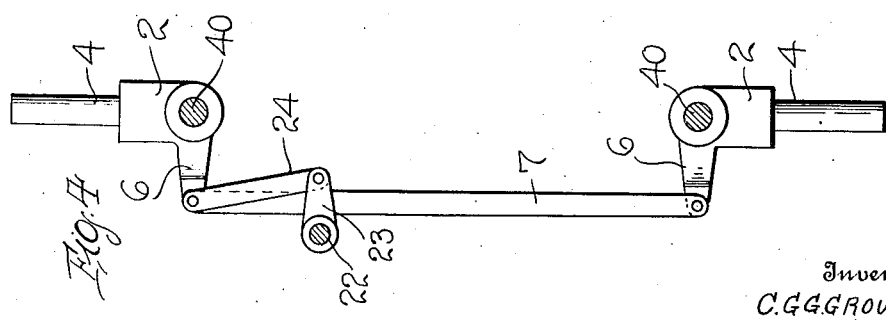
Witnesses
Robert M. Sutphen.
A. L. Hind.
Inventor
C. G. G. GROUPE
By Watson E. Coleman
Attorney

UNITED STATES PATENT OFFICE.

CHARLES GEORGE GORDON GROUPE, OF JERSEY SHORE, PENNSYLVANIA.

AGRICULTURAL APPARATUS.

1,113,431. Specification of Letters Patent. Patented Oct. 13, 1914.

Application filed November 8, 1913. Serial No. 799,956.

*To all whom it may concern:*

Be it known that I, CHARLES GEORGE GORDON GROUPE, a citizen of the United States, residing at Jersey Shore, in the county of Lycoming and State of Pennsylvania, have invented certain new and useful Improvements in Agricultural Apparatus, of which the following is a specification, reference being had to the accompanying drawings.

This invention relates to certain improvements in agricultural apparatus and has relation more particularly to a device of this general character which is motor driven and an object of the invention is to provide a device of this general character having means of a novel and improved character whereby the advance of the device may be automatically stopped should undue obstruction be encountered.

The invention also has for its object to provide a device of this general character whereby the direction of travel of the same may be readily and conveniently controlled.

The invention consists in the details of construction and in the combination and arrangement of the several parts whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a view in top plan of an agricultural machine constructed in accordance with an embodiment of my invention; Fig. 2 is a sectional view taken substantially on the line 2—2 of Fig. 1; Fig. 3 is a view in front elevation of the device, as shown in Fig. 1; Fig. 4 is an enlarged fragmentary view partly in top plan and partly in section illustrating certain details of the steering mechanism for the forward wheels of the device, as herein set forth; Fig. 5 is a fragmentary view, in perspective, of certain details of the propelling means, as herein embodied; and Fig. 6 is a fragmentary view in elevation illustrating a certain detail of the invention, as herein set forth.

As disclosed in the accompanying drawings, 1 denotes a frame of any suitable configuration and dimensions having pivotally supported for swinging movement in substantially a horizontal plane and adjacent the forward end thereof, the knuckles 2 provided with the stub shafts 4 on which the traction wheels 5—5 are adapted to be loosely mounted. Each of the knuckles 2 is provided with a rearwardly directed arm or extension 6—6, such arms or extensions 6 are operatively connected by the drag link or arm 7 whereby such knuckles 2—2 may be caused to move upon their pivots in unison and in the same general directions.

The frame 1 is provided with a rear extension 8 having afforded at its outer extremity a bearing 9 in which is mounted the vertically directed shaft 10 and on which is loosely mounted for movement in a horizontal plane a knuckle 11 provided with the stub shaft 12 on which is loosely mounted the rear supporting or traction wheel 14.

The knuckle 11 is provided with an extension or arm 15 to which is pivotally secured an end portion of a linked member 16 which is, in turn, pivotally engaged with a rock arm 17 laterally directed from the vertically disposed rock shaft 18 suitably mounted in the frame 1. The upper end portion of the rock shaft 18 has affixed thereto a worm 19 adapted to mesh with the worm shaft 20 suitably mounted for axial movement upon the frame 1 and preferably disposed substantially horizontal. The shaft 20 is also in mesh with a second worm 21 fixed to the upper extremity of a second vertical rock shaft 22 suitably mounted in the frame 1 and such shaft 22 is provided with a forwardly directed rock arm 23 in pivotal engagement with a link 24 which, in turn, is in pivotal engagement with an arm or extension 6 of one of the knuckles 2, hereinbefore referred to.

It is thought to be obvious that upon proper rotation of the shaft 20, the direction of travel of my improved apparatus can be readily and conveniently controlled and while any means may be employed for imparting the requisite axial movement to such shaft 20, I find it of advantage to employ the arrangement disclosed in the accompanying drawings and wherein such shaft 20 intermediate its length is provided with a worm 25 adapted to coact with a worm 26 carried by the lower extremity of an upwardly directed steering shaft 27 adapted to be manipulated through the conventional hand wheel, as indicated by dotted lines at 28 in Fig. 1.

From the foregoing description relative to the steering means for my improved agricultural apparatus, it will be seen that all of the supporting or traction wheels are manipulated whereby a more convenient and expeditious control of the travel of the apparatus may be had.

As herein disclosed, I have extending longitudinally of the frame 1 and the extension 8 thereof, the driven shaft 29 mounted in suitable bearings 30 projecting upwardly of the frame and operatively connected, as at 31, with the drive shaft 32 of the motor 33, which motor is also carried by the frame 1 and is preferably of an internal combustion type although it is to be understood that any form of motor may be employed as will operate with convenience and facility. The connection 31, hereinbefore referred to, is under control of the clutch member 34 carried by the driving shaft 32 for a purpose to be hereinafter more particularly set forth.

As herein disclosed, the forward extremity of the shaft 29 is operatively connected through the medium of the gears 35 with the shaft 36 disposed transversely of the frame 1 adjacent the forward end thereof and which shaft has interposed therein a differential, as indicated at 37, of any conventional type for purposes which are believed to be self-evident, and as the differential in its details forms no part of my invention it is not believed that a further detail thereof is necessary herein.

Each of the forward supporting or traction wheels 5 is provided with a beveled gear 38 concentric with the axis thereof and which is in mesh with a second beveled gear 39 fixed to a vertically disposed shaft 40 projecting above the frame 1, such projected portion of the shaft 40 being operatively connected with the transverse shaft 36 through the medium of the gearing 41, whereby it will be seen that the driven shaft 29 will be caused to properly rotate the wheels 5.

The rear supporting or traction wheel 14 is also adapted to be positively driven and for that purpose such wheel is provided with the beveled gear 42 disposed concentric with the axis thereof and in mesh with the beveled gear 43 carried by the vertical shaft 10, the upper extremity of which shaft is operatively connected with the driven shaft 29 through the medium of the gearing 44.

Pivotally engaged with an under portion of the frame 1 adjacent the forward end thereof and extending rearwardly of the frame are the beams 45 of predetermined length having their intermediate portions slotted, as at 46, to accommodate the upper extremities of the standards 47 pivotally held thereto through the medium of the bolts 48, the lower extremities of such stems being adapted to have suitably secured thereto the plow shares 49.

The rear end portion of each of the beams 45 is supported and adjusted through the medium of the pitman 50 pivotally secured thereto, as at 51, while the opposite extremity of such pitman is pivotally secured, as at 52, to the rod 53 provided with the piston 54 mounted within a cylinder 55 suitably supported by the frame 1. The standard 47 is normally maintained in substantially a vertical position and, as herein disclosed, this normal position is maintained through the medium of laterally directed projections 56 carried by the standard and which are adapted to abut the under surface of the beam 45, such contact being maintained through the medium of the arm 57 pivotally secured to the beam adjacent the lower end thereof and directed through a suitable passage-way 58 adjacent the rear end of the beam and through which such arm is adapted to loosely travel. Intermediate its length such arm 57 is provided with an abutment 59 and interposed between such abutment 59 and the under surface of the rear extremity of the beam is an expansible member 60, herein shown as a coil spring embracing the arm 57, possessing sufficient strain as to maintain the standard 47 under normal conditions in its vertical position. In order to regulate the tension of the expansible member 60 the abutment 59 may be in threaded engagement with the arm 57 whereby the abutment may be adjusted endwise of the arm, as will be readily appreciated by those skilled in the art to which my present invention appertains.

The reciprocable movement of the rod 53 serves to elevate the beam, when required, or to force the share within the soil especially when the soil is of such a character as to offer undue resistance and, as herein disclosed, the requisite recurrent movement of the rod 53 is created by the proper action of compressed air upon the piston 54 and, as herein disclosed, the heads of the cylinder 55 are in communication with a main supply conduit 61 through the branch conduits 62, the flow of the fluid through such branches being under control of the three-way valve 63 of any conventional type. In view of the general understanding of the operation of a three-way valve it is not believed that a detailed description or illustration need be given. The main conduit 61 is in communication with a storage or supply tank 64 suitably mounted on the frame 1 and this tank 64 is in communication with the conduit 65 leading from a conventional air compressor 66 mounted on the frame 1 and operatively connected, as indicated at 67, with the motor 33.

I have also found in practice that it is particularly advantageous to provide a means whereby the downward movement imparted to the beam 45 by the rod 53 may be limited and, as herein disclosed, I accomplish this result through the medium of the linked member 68 suitably secured to the beam 45 and adapted to coöperate with the hook member 69 depending from the frame 1. By this arrangement it is thought to be obvious that the limit of downward movement of the beam 45 may be varied in order to meet the requirements of practice.

It often occurs in operation that a share 49 may encounter an obstruction capable of offering such resistance as will result either in a breaking of such share or in interfering with the advance of my improved apparatus which would tend to injure the same. In order to guard against this contingency I have suitably secured, as at 70, to the forward face of the standard 45 a flexible member 71 which is also in engagement with a rock arm 72 projecting laterally from a shaft 73 suitably mounted in the frame 1 and extending transversely thereacross and in close proximity to the motor 33. The shaft 73 is also provided with a rock arm 74 positioned in close proximity to the clutch member 34 which is adapted to project through the bifurcated extremity 75 of a bell lever 76 suitably pivoted to the frame 1 while the opposite extremity of such lever 76 terminates in a fork 77 adapted to partially embrace the clutch member 34 and provided with inwardly directed fingers 78 adapted to extend within the annular groove 79 afforded in such clutch member 34 whereby it will be readily perceived that the movement imparted to the shaft 73 through the rear travel of the standard 47 will result in a disengagement of the clutch member 34 from the adjacent gear of the connection 31 whereby it will be perceived that the travel of the apparatus will be substantially instantaneously stopped.

In order to maintain the requisite tension on the flexible member 71 so that there will be no resultant lost motion I provide the shaft 73, as herein disclosed, with the arm 80 to which is suitably secured an extremity of a retractible spring 81 the opposite extremity of which is suitably anchored, as at 82, to the frame 1 at a point below the arm 80, the resultant action of the spring 81 being, it is thought, clearly apparent.

From the foregoing description it is thought to be obvious that an agricultural apparatus constructed in accordance with my invention is of an extremely simple and comparatively inexpensive nature and is particularly well adapted for use by reason of the effective control of its travel and of the implements carried thereby and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

Having thus fully described my invention what I desire to secure and claim by Letters Patent, is:—

A device of the character described including a frame, supporting wheels therefor, a motor carried by the frame, operative connections between the motor and the wheel, such connections including a clutch mechanism, an element movably carried by the frame, a rock shaft carried by the frame, a bell lever co-acting with the clutch mechanism for throwing the same into and out of operative adjustment, an arm carried by the rock shaft operatively engaged with the bell lever, a flexible connection between the movable element and the rock shaft, whereby the movement of the rock shaft is under control of the movable element, a second arm carried by the rock shaft, and a retractible member pivotally engaged with the second arm and to the frame at a point below the rock shaft whereby the requisite tension is maintained on the flexible connection.

In testimony whereof I hereunto affix my signature in the presence of two witnesses.

CHARLES GEORGE GORDON GROUPE.

Witnesses:
D. W. GALL,
FREDERICK S. STITT.